Dec. 21, 1948.　　　C. C. S. LE CLAIR　　　2,457,052
COUPLING FOR USE IN FLUID SUPPLY SYSTEMS
Filed Jan. 24, 1947　　　2 Sheets-Sheet 1
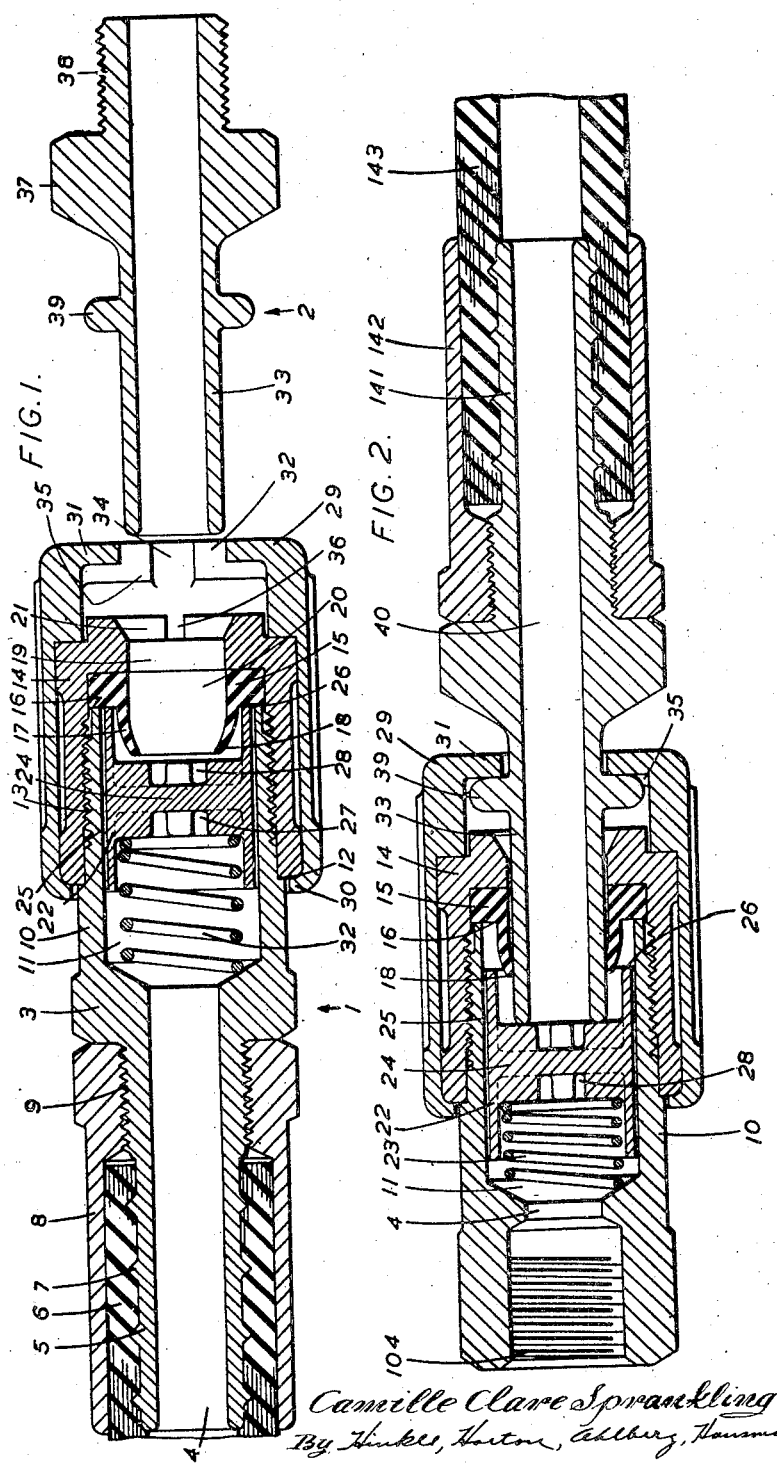
Inventor
Camille Clare Sprankling Le Clair
By Hinkel, Horton, Adelberg, Hausmann & Wupper
Attorneys Dec. 21, 1948.  C. C. S. LE CLAIR  2,457,052
COUPLING FOR USE IN FLUID SUPPLY SYSTEMS
Filed Jan. 24, 1947  2 Sheets-Sheet 2
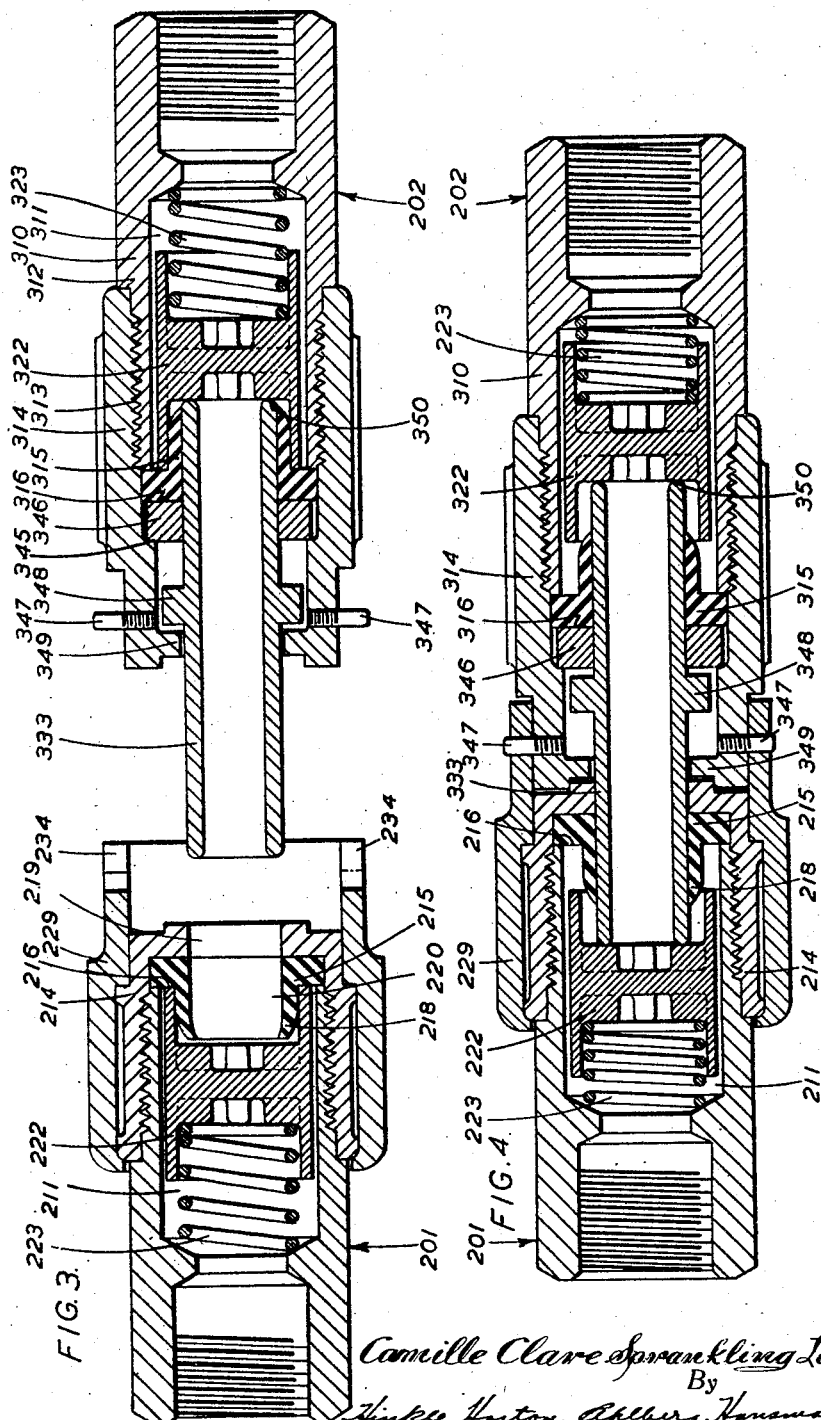
Inventor
Camille Clare Sprankling Le Clair
By
Hinkle, Horton, Ahlberg, Hanamann & Wupper
Attorneys.

Patented Dec. 21, 1948

2,457,052

UNITED STATES PATENT OFFICE 2,457,052

COUPLING FOR USE IN FLUID SUPPLY SYSTEMS

Camille Clare Sprankling Le Clair, Acton, London, England, assignor to Tecalemit Limited, Brentford, England, a corporation of Great Britain Application January 24, 1947, Serial No. 723,923
In Great Britain January 30, 1946

12 Claims. (Cl. 284—19)

This invention relates to couplings for use in fluid supply systems, of the type comprising two detachable coupling members or ends one of which is adapted to be connected by a flexible hose or rigid pipe or directly to a source of fluid supply and the other of which is adapted to be connected, either by a flexible hose or rigid pipe or directly, to a place of use of the fluid, which coupling members each include a duct for the fluid and when joined together form a fluid-tight engagement with each other.

Such couplings may, for example, be used in systems for the supply of compressed air, combustible or other gas, or water, oil or other liquids. They may be used for coupling one length of hose to another or for coupling a hose to a fixed pipe or to a fixed supply or receiving apparatus. They may also be used, in certain cases, for coupling one piece of apparatus directly to another.

Couplings of the above type have been proposed in which one or each of the coupling members is provided with a valve which is adapted to prevent escape of fluid from the member when the coupling is disengaged.

It is an object of the present invention to provide an improved coupling of the type referred to in which at least one of the coupling members is provided with a valve for this purpose which is simple in construction and reliable in operation.

A further object of the invention is the provision of a fluid coupling in which leakage of fluid from the coupling member is reliably prevented, both when the coupling is engaged or coupled and when it is disengaged.

Yet another object of the invention is the provision of a fluid coupling in which both of the coupling members are provided with valves and in which both the valves are constructed and arranged in a similar manner, the arrangement preferably being such that a substantial number of the components used in the construction of one coupling member are similar to those used in the construction of the other member. This reduces the total number of the types of parts which have to be manufactured and results in a saving in cost.

Other objects of the invention will appear hereinafter.

In the coupling of the invention one or both of the coupling members may be provided with a valve. For the purpose of the following description the type of coupling in which one member only is provided with a valve will be referred to as a "single-ended coupling," while the type of coupling in which both members are provided with valves will be described as a "double-ended coupling."

In the description of a single-ended coupling, that member or end which includes the valve will be referred to as the "valve member" and the complementary member or end as the "ferrule member." In the description of the double-ended coupling, the member which corresponds to the valve member of a single-ended coupling will still be referred to as the "valve member," and the complementary member, though it also contains a valve, will still be referred to as the "ferrule member."

It will be appreciated that, since the valve or valves is or are opened and held open when the two coupling members are engaged, the valve or valves do not function in a non-return fashion, and hence fluid may flow in either direction through the coupling. Thus, either the valve member or the ferrule member may be connected to a source of supply or to a place of use, but it will be further understood that where a single-ended coupling is used it may be necessary to provide alternative means of shutting off either the supply source or the place of use to which the ferrule member is attached.

In order that the said invention may be clearly understood and readily carried into effect the same will now be more fully described, by way of example, with reference to the accompanying drawings, in which:

Figure 1 is a sectional view of a single-ended coupling with the coupling members uncoupled from each other;

Figure 2 is a sectional view of a single-ended coupling, showing modified forms of coupling members; in this view the members are shown coupled together;

Figure 3 is a sectional view of a double-ended coupling with the members uncoupled; and Figure 4 is a sectional view of the same double-ended coupling, showing the members coupled together.

Referring first to Figure 1, the valve member is indicated generally at 1 and the ferrule member is indicated at 2.

The member 1 comprises a body which is generally of cylindrical shape. Approximately at its mid-length position it is formed with a spanner-engaging part 3, on one side of which the body is of reduced diameter in the form of a hollow ferrule 5, through which runs an axial fluid duct 4. This ferrule is adapted to fit into the end of a hose 6 and, for greater security, is formed with axially-spaced projecting ridges 7. The hose is retained in position by means of a clamping sleeve 8 which is screwed onto a threaded portion 9 at the base of the ferrule 5 adjacent the spanner engaging part 3.

On the other side of the spanner engaging part 3, remote from the ferrule 5, is a tubular extension 10 within which is a valve chamber 11 which is in communication with the duct 4. The outside of the extension 10 is formed with a shoulder 12 and with an external thread 13, on which is screwed an internally threaded union nut 14. A resilient sealing member 15, which may be made of rubber, synthetic rubber or other suitable material, is provided. As is shown in the drawing this sealing member comprises an external flange part 16 and a tubular sealing part 17, which latter is formed with an inwardly inclined sealing lip 18. The sealing member 15 is fitted to the member 1 with the tubular part 17 extending into the end of the tubular extension 10. The rim of the flange 16 is clamped between the union nut 14 and the end of the extension 10. The arrangement is such that when the union nut 14 is screwed up against the shoulder 12 the flange 16 is gripped sufficiently tightly to effect a liquid-tight seal but not sufficiently tightly to cause serious distortion of the flange.

The union nut 14 is formed with an opening 19 in its end, corresponding to the central aperture 20 in the sealing member. The outer end of this opening 19 is preferably flared as is shown at 21.

Within the valve chamber 11 there is slidably mounted a cylindrical valve element 22, which is acted upon by a spring 23, urging it on to its seat on the flange 16.

The ends of the cylindrical valve element 22 are open but are separated from each other by a partition or wall 24. The external surface of the element is formed with longitudinally extending grooves 25 to allow fluid to pass from one end of the chamber 11 to the other past the valve element. Alternatively the grooves 25 could be omitted and the valve element made a sufficiently slack fit in the chamber 11 to provide a passage between the valve element and the walls of the chamber 11 for the flow of fluid.

The end or rim 26 of the valve element 22 is adapted to make a sealing engagement with the flange 16 of the sealing member 15 under the action of the spring 23. The inner and outer faces of the partition wall 24 are formed with radially extending passages 27 and 28.

The union nut 14 is enclosed in a sleeve 29 which is freely rotatable on the nut 14 and is retained in position thereon by having its end swaged over the end of the nut as at 30.

The end of the sleeve 29 is formed with an inwardly extending flange 31 which surrounds a central aperture 32, which latter is adapted to receive the tubular end 33 of the complementary or ferrule coupling member 2. Two diametrically opposed radial entry slots 34 are cut in the flange 31, while the inner face of this flange is also formed with two radially extending grooves 35 which are arranged at right angles to the slots 34.

The sleeve 29 prevents an ordinary spanner from being used to tighten up the union nut 14, so in order to enable this to be done, the end of the nut is formed with diametrically opposed slots 36 in which a suitable tool may be engaged.

The coupling member 2 not only comprises the cylindrical ferrule part 33, which is adapted to enter into the coupling member 1 through the apertures 32, 19 and 20 in the parts 29, 14 and 15 respectively, but it also comprises a large hexagonal spanner-engaging part 37 and a threaded shank 38 by means of which shank the member may be attached to a pipe or to a place of use. The ferrule part 33 is also provided with a pair of diametrically opposed projecting lugs 39, while a fluid duct 40 is provided extending the full length of the coupling member.

The coupling shown in Figure 2 is also of the single-ended type but in this case the parts are shown coupled together, the same reference numbers as far as they go being used again.

In this view, however, the opportunity is taken to show different methods of attachment. For example, the body of the valve member is shown having an internal thread 104 which is suitable for attachment to a rigid pipe or fixed piece of apparatus comprising part of the fluid system.

Similarly, the ferrule member is shown with an internal ferrule 141 and a clamping sleeve 142 for the attachment of a hose 143. Those parts 141 and 142 are similar to those numbered 5 and 8 described with reference to the valve member 1 of Figure 1.

The operation of a single ended type of coupling will now be described with reference to Figures 1 and 2 of the drawings.

With the coupling members in the uncoupled position shown in Figure 1 the fluid duct 4 in the member 1 is closed by means of the valve 22, the rim 26 of which is pressed against the flange or seat 16 by the action of the spring 23 and by the pressure of the fluid in the chamber 11 acting on the valve.

To couple the members together the tubular end 33 of the ferrule member is passed through the aperture 32 in the sleeve 29, through the opening 19 in the union nut 14 and through the central aperture 20 in the sealing member 15, thus contacting and forming a sealing engagement with the sealing lip 18 of the member 15. Having done this it engages the wall or partition 24 of the valve element 22. At or about this time the lugs 39, being rotated 90° from the position shown in the drawing, enter the slots 34 in the flange 31 of the sleeve 29.

Further inward movement of the ferrule part 33 causes its end to press the valve element 22 off its seat on the flange 16, thereby putting the fluid duct 4 in the member 1 in communication with the fluid duct 40 in the member tube, the fluid being able to flow through the chamber 11, through the grooves 25, between the end 26 of the valve element 22 and the seat or flange 16 of the sealing member 15, through the grooves 28 around the end of the ferrule part 33 and thus into the duct 40. The sealing lip 18, which is urged against the outer surface of the ferrule part 33 by its own resiliency and by the pressure of the fluid, provides an effective seal against the escape of fluid from the coupling.

When the ferrule member has been fully inserted into the member 1 the sleeve 29 is rotated through 90° until the lugs 39 coincide with the grooves 35. They are held in these grooves, thereby retaining the members 1 and 2 coupled together, by the force of the spring 23 and by the pressure of the fluid, but the members can readily be uncoupled from each other merely by reversing the above procedure.

Thus, to uncouple the members of the coupling, the ferrule member 2 is first thrust towards the valve member 1, thus freeing the lugs 39 from the grooves 35; it is then rotated through 90° to bring the lug 39 into line with the slot 34 and finally the members are drawn apart, the lugs 39 once more passing through the slots 34. As the ferrule part 33 is withdrawn it allows the valve element 22 to be pressed forward by the spring 23 towards its seat on the flange 16, which it reaches and with which it forms a liquid tight engagement before the ferrule part 33 leaves the sealing lip 18. This ensures that no escape of fluid can occur.

As has been mentioned above, the valve member of the coupling may be connected either to the source of supply or to a place of use of the pressure fluid. In either case it may be necessary to provide other means, such as a shut-off cock or valve, for controlling the flow of fluid to or from the ferrule member.

The construction of a double-ended coupling will now be described with reference to Figures 3 and 4 of the drawings.

Referring first to Figure 3, this shows a coupling comprising a valve member 201 and a ferrule member 202, both of which members include a valve element.

The valve member 201 differs from that shown in Figure 2 in the construction of the union nut (indicated at 214) and of the outer sleeve, which, in this construction is indicated by the reference 229. The valve element (indicated at 222) which corresponds to the valve element 22 is shown as a slack fit in its chamber 211 instead of being formed with longitudinal grooves corresponding to the grooves 25. It will be appreciated, however, that the valve element could alternatively be formed with grooves similar to the grooves 25.

The union nut 214 differs from the nut 14 only in that its end is made of rather less thickness and the opening 219 therein is not shown as being tapered or flared, although it could be so formed if desired.

Instead of being flanged inwardly the sleeve 229 is joined with an open end, while the walls of the sleeve are formed with a pair of diametrically opposed bayonet slots 234 which fulfill similar functions as the slots 34 and grooves 35 of the previous construction.

The remaining parts of the valve members are identical in the two constructions.

The complementary or ferrule member 202 comprises a body having a cylindrical part 310, a valve element 322, a spring 323 and a sealing member 315, all of which are similar to the corresponding parts of the valve member 201. A different form of union nut is provided, however. This nut 314, which is of rather greater length than the nut 214, is screwed onto the external thread 313 of the body and against the shoulder 312. The nut 314 is formed with an internal shoulder 345 which engages a guide ring 346 and clamps it against the flange 316 of the sealing member 315. The arrangement again is such that when the nut is screwed up against the shoulder 312 the flange of the sealing member 315 is gripped sufficiently tightly to make a liquid-tight seal but not sufficiently tightly to cause serious distortion of the sealing member.

The union nut 314 is also provided with a pair of projecting bayonet pins 347 which, when the members are coupled together, are adapted to engage in the bayonet slots 234.

A ferrule part 333, which is parallel throughout its length and is formed with an external collar or flange 348 at about its mid-point, is slidably mounted in the ring 346 and in the opening in an inwardly extending flange 349 on the end of the nut 314. Its movement in the outward direction is limited by the engagement of the collar 348 with the flange 349, while its movement in the inward direction is limited by the engagement of the collar 348 with the guide ring 346. The amount of movement permitted by these parts is substantially equal to the possible lift of the valve element 322 and the arrangement is such that when the part 333 is in its outermost position its inner end 350 is still in engagement with the sealing member 315.

When the coupling members 201 and 202 are disengaged from each other, as shown in Figure 3, the valve element 222 is held on its seat by the spring 223, thus preventing escape of fluid from that end of the fluid system, while in the ferrule member 202 the valve element 322 is also held on its seat by the spring 323 thus closing that end of the system. The ferrule part 333 is thrust outwardly towards the outer limit of its travel, there being sufficient clearance between the collar 348 and the flange 349 to ensure that the valve element 322 is properly seated.

To couple the two halves of the coupling together, the ferrule part 333 is introduced into the opening 219 in the union nut 214 and into the central aperture 220 in the sealing member 215, with the lip 218 of which it makes sealing engagement. Having done this it then engages the valve element 222 and forces it back off its seat. At the same time the reaction of the ferrule part 333 causes its other end 350 to engage and press back the valve element 322 against the force of the spring 323, thus forcing this valve off its seat.

Towards the completion of the engaging movement of the members 201 and 202, the bayonet pins 347 enter the slots 234 in which they are locked by turning the sleeve 229 through a small angle.

When coupled together the parts occupy the positions shown in Figure 4, it being noted that the total length of the ferrule part 333 and the dimensions of the other parts are such that both the valve elements 222 and 322 are positively prevented from engaging their respective seats. The fluid-tightness of the coupling is ensured by the engagement of the sealing lips 218 and 318 of the sealing members 215 and 315 against the outer surfaces of the ends of the ferrule part 333.

When the coupling members are disengaged from each other by a reversal of the operations described above the two valve elements 222 and 322 will engage their seats 216 and 316 before the end of the ferrule part is withdrawn from the sealing member 215, thus ensuring that no fluid can escape.

It will be apparent from the foregoing description that the respective coupling members may be adapted to be attached in any desired manner to the rest of the fluid system, whether to a flexible hose or to a rigid pipe or to a fixed or movable source or reservoir of fluid or apparatus utilising the fluid, and the construction of the valve members may be adapted accordingly. Furthermore the method of attaching the coupling members together may be modified, for example by providing a screwed engagement between the sleeve 29 or 229 and some suitable part of the ferrule member 2 or 202.

I claim:

1. A coupling for use in fluid systems comprising two coupling members each formed with a duct for the passage of fluid therethrough and means for coupling said members together in a fluid-tight manner with the fluid duct in one member in communication with the fluid duct in the other member, one of said coupling members comprising a body part and a tubular ferrule part extending therefrom, and the other of said coupling members comprising a body-part, a valve having a tubular portion provided with an annular valve face, and a resilient element mounted in said body part, said resilient element comprising an annular section, one face of which forms a seat for said valve, and a tubular section projecting from said annular section inside said tubular portion of said valve, the arrangement being such that when the coupling members are coupled together the ferrule part on the first member passes through the resilient element in the second member, the tubular section of the resilient element forming a fluid-tight seal with the outer surface of the ferrule part and being adapted to be urged into contact with said surface by fluid pressure within the coupling member, whereafter the ferrule part engages said valve and moves it off its seat, thereby allowing fluid to flow from one coupling member to the other through said ferrule part.

2. A coupling for use in fluid systems comprising two coupling members each formed with a duct for the passage of fluid therethrough and means for coupling said members together in a fluid-tight manner with the fluid duct in one member in communication with the fluid duct in the other member, one of said coupling members comprising a body part and a tubular ferrule part extending therefrom, and the other of said coupling members comprising a body-part, a valve slidably mounted in said body part, said valve having a transverse wall and a tubular portion extending from said wall, the end of said tubular portion forming an annular valve face, and a resilient element mounted in said body part, said resilient element comprising an annular section, one face of which forms a seat for said valve, and a tubular section projecting from said annular section inside said tubular portion of said valve, the arrangement being such that when the coupling members are coupled together the ferrule part on the first member passes through the resilient element in the second member, the tubular section of the resilient element forming a fluid-tight seal with the outer surface of the ferrule part and being adapted to be urged into contact with said surface by fluid pressure within the coupling member, whereafter the ferrule part engages said transverse wall to move said valve off its seat, thereby allowing fluid to flow from one coupling member to the other through said ferrule part.

3. A coupling for use in fluid systems comprising two coupling members each formed with a duct for the passage of fluid therethrough and means for coupling said members together in a fluid-tight manner with the fluid duct in one member in communication with the fluid duct in the other member, one of said coupling members comprising a body part and a tubular ferrule part extending therefrom, and the other of said coupling members comprising a body-part formed with a chamber therein, a tubular valve element slidable in said chamber, said valve element being formed with a transverse wall separating one end of the chamber from the other and being so formed and dimensioned externally as to allow fluid to flow from one end of the chamber to the other externally of said valve element within said chamber, one end of said tubular valve element being formed as an annular valve face, and a resilient element mounted in said body part, said resilient element comprising an annular section, one face of which forms a seat for said valve, and a tubular section projecting from said annular section inside said tubular portion of said valve, the arrangement being such that when the coupling members are coupled together the ferrule part on the first member passes through the resilient element in the second member, the tubular section of the resilient element forming a fluid-tight seal with the outer surface of the ferrule part and being adapted to be urged into contact with said surface by fluid pressure within the coupling member, whereafter the ferrule part engages said transverse wall to move said valve element off its seat and thereby to allow fluid to flow from one coupling member to the other through said ferrule part.

4. A coupling for use in fluid systems comprising two coupling members each formed with a duct for the passage of fluid therethrough and means for coupling said members together in a fluid-tight manner with the fluid duct in one member in communication with the fluid duct in the other member, one of said coupling members comprising a body part and a tubular ferrule part extending therefrom, and the other of said coupling members comprising a body-part formed with a chamber therein, a tubular valve element slidable in said chamber, said valve element being formed with a transverse wall separating one end of the chamber from the other and being so formed and dimensioned externally as to allow fluid to flow from one end of the chamber to the other externally of said valve element within said chamber, one end of said tubular valve element being formed as an annular valve face, a resilient element mounted in said body part, said resilient element comprising an annular section, one face of which forms a seat for said valve, and a tubular section projecting from said annular section inside said tubular portion of said valve element, and a spring located in said chamber and bearing on said transverse wall to urge said valve element into its closed position, the arrangement being such that when the coupling members are coupled together the ferrule part on the first member passes through the resilient element in the second member, the tubular section of the resilient element forming a fluid-tight seal with the outer surface of the ferrule part and being adapted to be urged into contact with said surface by fluid pressure within the coupling member, whereafter the ferrule part engages said transverse wall to move said valve element off its seat against the pressure of said spring and thereby to allow fluid to flow from one coupling member to the other through said ferrule part, said transverse wall being formed where it is engaged by the end of said ferrule part with a passage to allow free flow of fluid past the end of said ferrule part.

5. A coupling for use in fluid systems comprising two coupling members each formed with a duct for the passage of fluid therethrough and means for coupling said members together in a fluid-tight manner with the fluid duct in one member in communication with the fluid duct in the other member, one of said coupling members comprising a body part, a valve movably mounted in said body part and adapted to cut off the flow of fluid through the member, and a ferrule part movably mounted in said body part and adapted, when moved inwardly, to engage and open said valve, and the other of said coupling members comprising a body part, a valve having a tubular portion provided with an annular valve face and a resilient element mounted in said body part, said resilient element comprising an annular section, one face of which forms a seat for said valve, and a tubular section projecting from said annular section inside said tubular portion of said valve, the arrangement being such that when the coupling members are coupled together the ferrule part on the first member passes through the resilient element in the second member, the tubular section of the resilient element forming a fluid-tight seal with the outer surface of the ferrule part and being adapted to be urged into contact with said surface by fluid pressure within the coupling member, whereafter the ferrule part engages said valve and moves it off its seat, the ferrule part being forced inwardly in the first member to open the valve therein, thereby allowing fluid to flow from one coupling member to the other through the said ferrule part.

6. A coupling for use in fluid systems comprising two coupling members each formed with a duct for the passage of fluid therethrough and means for coupling said members together in a fluid-tight manner with the fluid duct in one member in communication with the fluid duct in the other member, one of said coupling members comprising a body part, a valve movably mounted in said body part and adapted to cut off the flow of fluid through the member, and a ferrule part movably mounted in said body part and adapted, when moved inwardly, to engage and open said valve, and the other of said coupling members comprising a body part, a valve slidably mounted in said body part, said valve having a transverse wall and a tubular portion extending from said wall, the end of said tubular portion forming an annular valve face, and a resilient element mounted in said body part, said resilient element comprising an annular section, one face of which forms a seat for said valve, and a tubular section projecting from said annular section inside said tubular portion of said valve, the arrangement being such that when the coupling members are coupled together the ferrule part on the first member passes through the resilient element in the second member, the tubular section of the resilient element forming a fluid-tight seal with the outer surface of said ferrule part and being adapted to be urged into contact with said surface by fluid pressure within the coupling member, whereafter said ferrule part engages said transverse wall to move said valve off its seat, said ferrule part being forced inwardly in the first member to open the valve therein, thereby allowing fluid to flow from one coupling member to the other through the said ferrule part.

7. A coupling for use in fluid systems comprising two coupling members each formed with a duct for the passage of fluid therethrough and means for coupling said members together in a fluid-tight manner with the fluid duct in one member in communication with the fluid duct in the other member, one of said coupling members comprising a body part, a valve movably mounted in said body part and adapted to cut off the flow of fluid through the member, and a ferrule part movably mounted in said body part and adapted, when moved inwardly, to engage and open said valve, and the other of said coupling members comprising a body part formed with a chamber therein, a tubular valve element slidable in said chamber, said valve element being formed with a transverse wall separating one end of the chamber from the other and being so formed and dimensioned externally as to allow fluid to flow from one end of said chamber to the other externally of said valve element within said chamber, one end of said tubular valve element being formed as an annular valve face, and a resilient element mounted in said body part, said resilient element comprising an annular section, one face of which forms a seat for said valve element, and a tubular section projecting from said annular section inside said tubular portion of said valve element, the arrangement being such that when the coupling members are coupled together the ferrule part on the first member passes through the resilient element in the second member, the tubular section of the resilient element forming a fluid-tight seal with the outer surface of the ferrule part and being adapted to be urged into contact with said surface by fluid pressure within the coupling member, whereafter the ferrule part engages said transverse wall to move said valve off its seat, the ferrule part being forced inwardly in the first member to open the valve therein, thereby allowing fluid to flow from one coupling member to the other through said ferrule part.

8. A coupling for use in fluid systems comprising two coupling members, each formed with a duct for the passage of fluid therethrough and means for coupling said members together in a fluid-tight manner with the fluid duct in one member in communication with the fluid duct in the other member, each of said coupling members comprising a body part, a valve having a tubular portion provided with an annular valve face, and a resilient element mounted in said body part, said resilient element comprising an annular section, one face of which forms a seat for said valve, and a tubular section projecting from said annular section inside said tubular portion of said valve, and one of said coupling members also including a tubular ferrule part one end of which passes through said resilient element with which it forms a fluid-tight seal and engages said valve and the other end of which ferrule part projects from the coupling member, the arrangement being such that when the coupling members are coupled together said ferrule part on the one member passes through the resilient element in the other member, the tubular section of the resilient element in this member forming a fluid-tight seal with the outer surface of said ferrule part, whereafter said ferrule part forces both said valves off their seats, thereby allowing fluid to flow from one coupling member to the other through the said ferrule part.

9. A coupling for use in fluid systems comprising two coupling members, each formed with a duct for the passage of fluid therethrough and means for coupling said members together in a fluid-tight manner with the fluid duct in one member in communication with the fluid duct in the other member, each of said coupling members comprising a body part, a valve slidably mounted in said body part, said valve having a transverse wall and a tubular portion extending from said wall, the end of said tubular portion forming an annular valve face, and a resilient element mounted in said body part, said resilient element comprising an annular section, one face of which forms a seat for said valve, and a tubular section projecting from said annular section inside said tubular portion of said valve, and one of said coupling members also including a slidably mounted tubular ferrule part one end of which passes through said resilient element with which it forms a fluid-tight seal and engages said transverse wall and the other end of which ferrule part projects from the coupling member, the arrangement being such that when the coupling members are coupled together said ferrule part on the one member passes through the resilient element in the other member, the tubular section of the resilient element in this member forming a fluid-tight seal with the outer surface of said ferrule part, whereafter said ferrule part forces both said valves off their seats, thereby allowing fluid to flow from one coupling member to the other through said ferrule part.

10. A coupling for use in fluid systems comprising two coupling members, each formed with a duct for the passage of fluid therethrough and means for coupling said members together in a fluid-tight manner with the fluid duct in one member in communication with the fluid duct in the other member, each of said coupling members comprising a body part formed with a chamber therein, a tubular valve element slidable in said chamber, said valve element being formed with a transverse wall separating one end of the chamber from the other and being so formed and dimensioned externally as to allow fluid to flow from one end of the chamber to the other externally of said valve element within said chamber, one end of said tubular valve element being formed as an annular valve face, and a resilient element mounted in said body part, said resilient element comprising an annular section, one face of which forms a seat for said valve element, and a tubular section projecting from said annular section inside said tubular portion of said valve element, and one of said coupling members also comprising a slidably mounted tubular ferrule part one end of which passes through said resilient element with which it forms a fluid-tight seal and engages said transverse wall and the other end of which ferrule part projects from the coupling member, the arrangement being such that when the coupling members are coupled together said ferrule part on the one member passes through the resilient element in the other member, the tubular section of the resilient element in this member forming a fluid-tight seal with the outer surface of said ferrule part, whereafter said ferrule part moves both said valves off their seats, thereby allowing fluid to flow from one coupling member to the other through the said ferrule part.

11. A fluid coupling for use in fluid systems comprising two coupling members each formed with a duct for the passage of fluid therethrough and means for coupling said members together in a fluid-tight manner with the fluid duct in one member in communication with the fluid duct in the other member, each of said coupling members comprising a valve adapted to cut off fluid flow from the member when the members are uncoupled from each other, one of said coupling members including a tubular ferrule part which is mounted for limited longitudinal movement in said member, and a resilient sealing element which engages the outer surface of said ferrule part to form a fluid-tight seal therewith, and the other said coupling member including a resilient sealing element through which said ferrule part is adapted to pass and with the outer surface of which it makes a fluid-tight seal when the members are coupled together, the arrangement being such that on coupling the members together the ends of said ferrule part engage both said valves to move them off their seats, thereby allowing fluid to flow from one coupling member to the other through said ferrule part.

12. A fluid coupling for use in fluid systems comprising two coupling members each formed with a duct for the passage of fluid therethrough and means for coupling said members together in a fluid-tight manner with the fluid duct in one member in communication with the fluid duct in the other member, each of said coupling members comprising a valve adapted to cut off fluid flow from the member when the members are uncoupled from each other, one of said coupling members including a tubular ferrule part which is mounted for limited longitudinal movement in said member, and a resilient sealing element which engages the outer surfaces of said ferrule part to form a fluid-tight seal therewith, and the other said coupling member including a resilient sealing element through which said ferrule part is adapted to pass and with the outer surface of which it makes a fluid-tight seal when the members are coupled together, the arrangement being such that on coupling the members together the ends of said ferrule part engage both said valves to move them off their seats, thereby allowing fluid to flow from one coupling member to the other through said ferrule part, each said resilient element comprising an annular portion forming a seat for said valve and each said valve comprising a tubular portion an end of which is adapted to engage said valve seat.

CAMILLE CLARE SPRANKLING LE CLAIR.

REFERENCES CITED

The following references are of record in the file of this patent:

UNITED STATES PATENTS

| Number | Name | Date |
| --- | --- | --- |
| 879,880 | Landau | Feb. 25, 1908 |
| 1,345,571 | Yates | July 6, 1920 |
| 1,869,411 | DeMooy | Aug. 2, 1932 |
| 2,044,252 | Mitchell | June 16, 1936 |
| 2,135,222 | Scheiwer | Nov. 1, 1938 |
| 2,248,701 | Fowler | July 8, 1941 |
| 2,268,020 | Dahlstrom | Dec. 30, 1941 |
| 2,344,739 | Shaff | Mar. 21, 1944 |
| 2,373,886 | Geiger | Apr. 17, 1945 |
| 2,419,503 | Scheiwer | Apr. 22, 1947 |